T. J. Mayall,
Rubber Spittoon.
No. 86,171.
Patented Jan. 26, 1869.
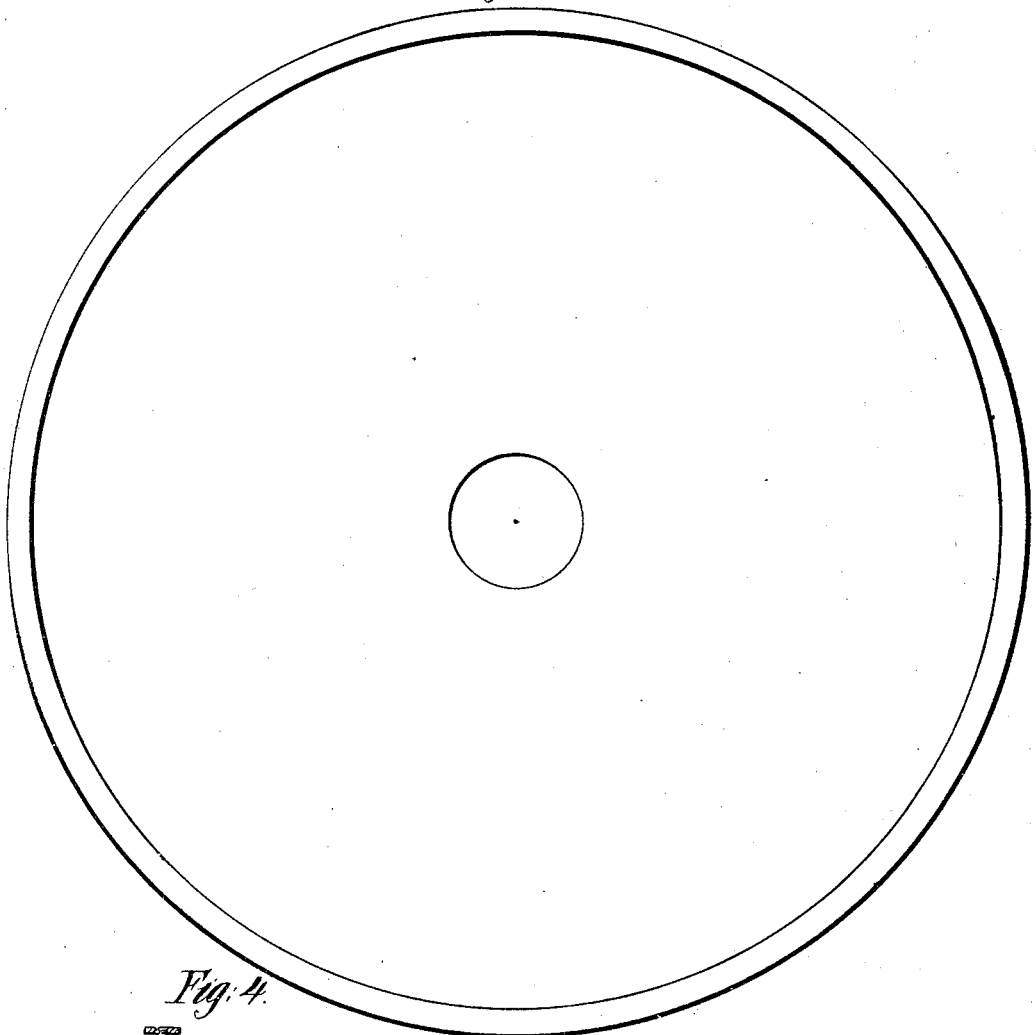
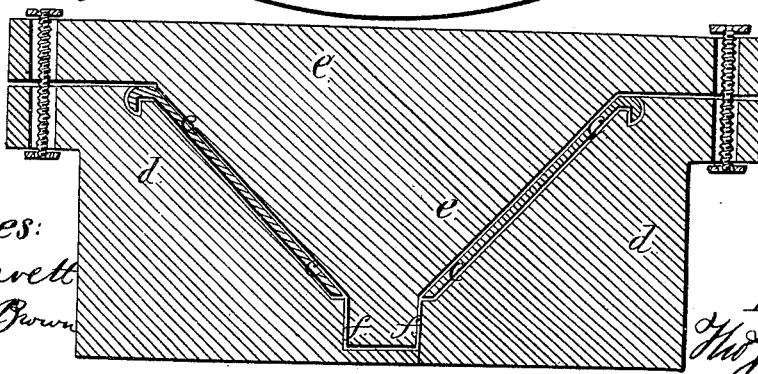
Witnesses:
Joseph Gavett
Albert W. Brown
Inventor:
Thos. J. Mayall

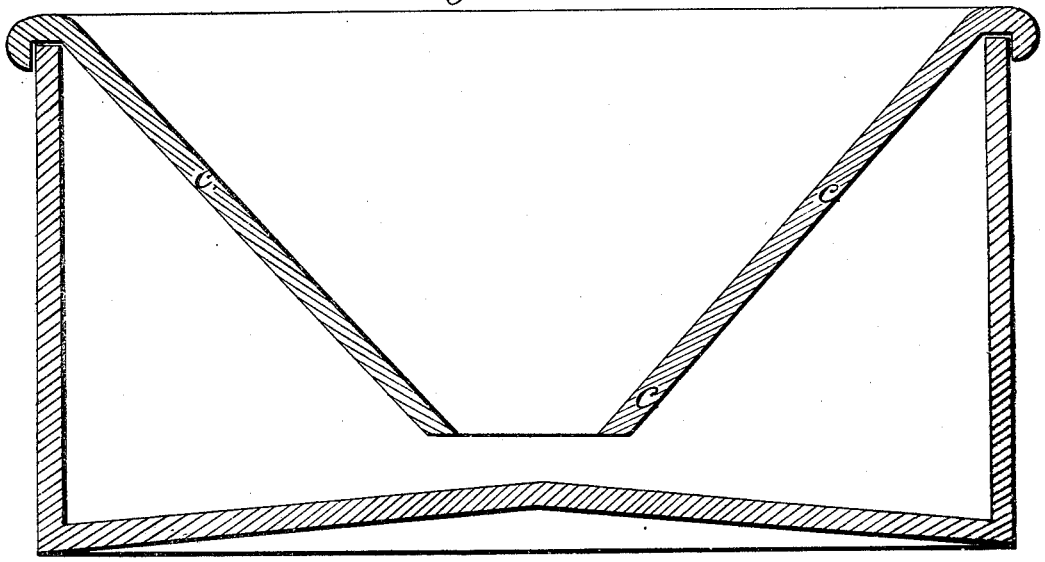
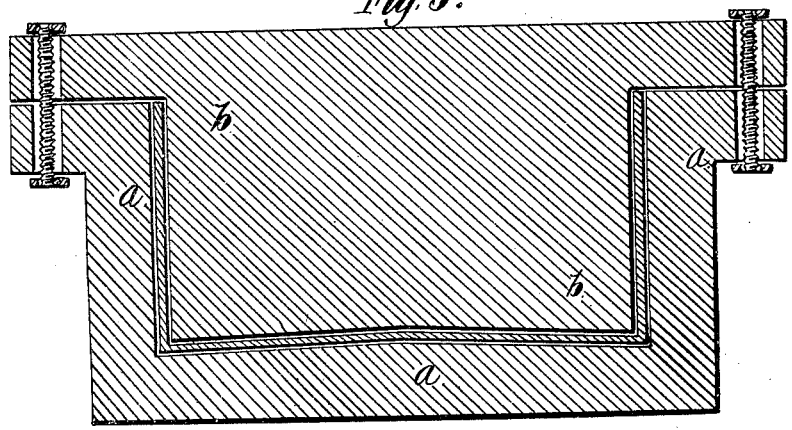

THOMAS J. MAYALL, OF ROXBURY, MASSACHUSETTS.

Letters Patent No. 86,171, dated January 26, 1869.

IMPROVEMENT IN THE MANUFACTURE OF SPITTOONS FROM RUBBER, GUTTA-PERCHA, &c.

The Schedule referred to in these Letters Patent and making part of the same

*To all persons to whom these presents shall come:*

Be it known that I, THOMAS J. MAYALL, of Roxbury, in the county of Suffolk, and State of Massachusetts, have invented certain new and useful Improvements in the Manufacture of Spittoons, or vessels to spit in; and that the following description, taken in connection with the accompanying drawings, hereinafter referred to, forms a full and exact specification of the same, wherein I have set forth the nature and principles of my improvements, together with such parts as I claim, and desire to have secured to me by Letters Patent.

The figures of the accompanying plate of drawings represent my improvements.

Figure 1 is a plan or top view of my improved spittoon.

Figure 2 is a central vertical section of the same.

Figure 3 is a central vertical section of the mould for forming the body of the spittoon.

Figure 4 is a similar section of the mould for forming the cover of the spittoon.

My invention consists of a new method of making spittoons, in such a manner that they cannot be broken by being dropped or by receiving blows, and, at the same time, producing a spittoon which can be made at a much less cost than any others previously manufactured.

To accomplish these results, I make the spittoon of India rubber or gutta-percha, or of a composition of either with other articles, and form the spittoon as I will now describe.

I make a composition of about the following proportions, viz:

Twelve pounds of rubber trimmings or clippings, a material well known among rubber-manufacturers, or the same quantity of gutta-percha, and four pounds of sulphur, and mix them thoroughly together.

The body or bottom of the spittoon is formed by placing the composition in a metallic mould, $a\ a$, fig. 3, and subjecting it to pressure by a die or follower, $b\ b$, which presses the soft rubber into the mould $a\ a$, which thereby imparts the desired form to the outside of the vessel, while the die $b\ b$ shapes the inside of the same.

The whole is then subjected to a heat, while pressed in the mould, of about 260°, for about one hour.

The cover $c\ c$ is formed in a similar manner, by means of a mould, $d\ d$, and a die or follower $e\ e$, the plunger $f\ f$ forming the hole in the cover.

The composition I have described, and the degree of heat to be used, admit of great variations, and I therefore do not limit myself to the proportions named, or the degree of heat to be employed.

It will be evident that, by varying the form of the moulds, and that of the dies or followers accordingly, a spittoon of any desired or ornamental configuration can be produced.

By the means above described, I am enabled to produce a spittoon which cannot be broken by accident, and which does not absorb fluids.

I would observe that spittoons, as heretofore constructed of brittle substance, were made, both the vessel proper and the funnel-shaped top, in one piece, but according to my invention, i. e., when the spittoon is made of rubber, or its equivalent composition, I have found it necessary to make them of two separable parts, i. e., of the vessel proper and a funnel-shaped cover, and the latter I provide with an annular flange, whereby the cover is snugly fitted on and held to the spittoon-vessel.

This arrangement is very advantageous, as it allows of the vessel being the more perfectly cleansed.

I therefore claim—

As a new article of manufacture, a spittoon formed of an India-rubber or gutta-percha composition, in two parts, substantially as herein shown and described.

Also, the combination, with the vessel of a spittoon, of a rubber or gutta-percha funnel-shaped cover, provided with an annular flange, whereby it is fitted in and held to the vessel, substantially as herein shown and set forth.

THOS. J. MAYALL.

Witnesses:
JOSEPH GAVETT,
ALBERT W. BROWN.